United States Patent [19]
Mizukuki et al.

[11] Patent Number: 5,486,396
[45] Date of Patent: Jan. 23, 1996

[54] OPTICAL RECORDING MEDIUM AND PRODUCTION THEREOF

[75] Inventors: Tadahiko Mizukuki, Tokyo; Kouichi Yabuuchi, Yamanashi; Shinichi Murakami, Kamakura; Tomoyoshi Sasakawa, Chiba; Kouhei Shizuka, Yokohama; Nobuhisa Kitagawa, Yokohama; Sumio Hirose, Yokohama, all of Japan

[73] Assignee: Mitsui Toatsu Chemicals, Incorporated, Tokyo, Japan

[21] Appl. No.: 417,257

[22] Filed: Apr. 5, 1995

Related U.S. Application Data

[62] Division of Ser. No. 176,929, Jan. 3, 1994, Pat. No. 5,424,102, which is a division of Ser. No. 885,784, May 20, 1992, abandoned.

[30] Foreign Application Priority Data

May 21, 1991 [JP] Japan .................................. 3-116024
Nov. 1, 1991 [JP] Japan .................................. 3-287663

[51] Int. Cl.⁶ .................................. B32B 3/00
[52] U.S. Cl. .................... 428/64.2; 428/64.4; 428/64.7; 428/64.8; 428/913; 430/945; 430/270.17; 430/270.15; 430/270.16; 369/272; 369/283; 369/288
[58] Field of Search ................... 428/64.4, 64.2, 428/64.7, 64.8, 913; 369/272, 283, 288; 430/270, 495, 945

[56] References Cited

U.S. PATENT DOCUMENTS

| | | | |
|---|---|---|---|
| 4,710,418 | 12/1987 | Takano et al. | 428/192 |
| 4,933,222 | 6/1990 | Masuda | 428/64 |
| 4,981,743 | 1/1991 | Ho | 428/64 |
| 4,983,505 | 1/1991 | Hoguchi et al. | 430/945 |
| 5,313,452 | 5/1994 | Usami | 369/275.1 |
| 5,382,460 | 1/1995 | Onagi | 428/64 |

FOREIGN PATENT DOCUMENTS

| | | |
|---|---|---|
| 0242217 | 10/1987 | European Pat. Off. |
| 0272875 | 6/1988 | European Pat. Off. |
| 2235811 | 3/1991 | European Pat. Off. |
| 2-236833 | 9/1990 | Japan |

OTHER PUBLICATIONS

Japanese Abstract No. JP 2183442, Jul. 18, 1990.
Japanese Abstract No. 60-243825, Dec. 3, 1985.
Japanese Abstract No. 61-29431, Feb. 10, 1986.

*Primary Examiner*—Patrick J. Ryan
*Assistant Examiner*—Elizabeth Evans
*Attorney, Agent, or Firm*—Millen, White, Zelano & Branigan

[57] ABSTRACT

An optical recording medium comprises a substrate, a recording layer overlying the substrate in a manner such that it is not present at the inner and outer peripheral portions of the substrate, a metal reflective layer overlying the recording layer in a manner such that the inner periphery of the metal reflective layer is coterminous with that of the recording layer while the outer peripheral portion of the reflective layer extends over the outer perphery of the recording layer, and a protective layer wholly covering the metal reflective layer extending over the recording layer, both at the inner and outer peripheral portions. The optical recording medium exhibits an excellent adhesion strength of the protective layer even when stood under high humidity and high temperature conditions for a long period of time, and the protective layer is not peeled off when subjected to a tape peeling test.

8 Claims, 2 Drawing Sheets

OPTICAL RECORDING MEDIUM AND PRODUCTION THEREOF

This is a division of application Ser. No. 08/176,929 filed Jan. 3, 1994, now U.S. Pat. No. 5,424,102 issued Jun. 13, 1995.

BACKGROUND OF THE INVENTION

1. Field of the Invention

The present invention relates to an optical recording medium, and more particularly, to an optical recording medium of a single plate type comprising a recording layer composed of a dye, having a high reflectivity, capable of recording a large volume of information to a process for producing the medium.

2. Description of the Related Art

Writable optical recording mediums of a single plate type playable by a commercially available compact disc (hereinafter called "CD") which comprises a recording layer composed of a dye, a metal reflective layer overlying the recording layer for enhancing reflectivity and a protective layer overlying the reflective layer are proposed, for example, in Optical Data Storage 1989 Technical Digest Series Vol. 1, 45 (1989), and EP-353393.

In these optical recording mediums, a protective layer is provided on a reflective layer in order to protect a recording layer and the reflective layer. As the protective layer, a hard resin, so-called "hard coat", is usually used to prevent the damage to the recording layer and the reflective layer.

Further, additional functions of the protective layer are the prevention of peeling of the recording layer and the reflective layer, inhibition of oxidative deterioration of the recording layer and the reflective layer, and thereby serving to improve the durability. Therefore, the adhesion between the protective layer and the reflective layer is required to be strong.

However, in the case of a medium using a dye in a recording layer, the recording layer is usually formed by spin-coating. An optical disc substrate has a groove, and when a recording layer is formed by spin-coating, the recording layer is formed on the whole surface of the substrate ranging from the further inside of the groove at the inner peripheral portion of the substrate to the outermost edge of the substrate.

Taking into consideration the adhesion between the protective layer and the reflective layer, it is demanded to remove the recording layer at the inner peripheral and outer peripheral portions of the substrate and form a protective layer extending over the peripheries of the recording layer and the reflective layer as proposed by Japanese Patent Application Laid-Open Nos. Hei 2-183442 and 2-236833.

In order to form the protective layer extending over both the recording layer and the reflective layer as shown, for example, in FIG. 4, it is necessary to provide a portion where the substrate is exposed at each of the inside of the innermost periphery and the outside of the outermost periphery (outermost edge) of the recording layer.

For the purpose of forming such a structure, heretofore, the recording layer formed at each of the outer and the inner peripheral portions has been removed. For example, the recording layer at the outer peripheral portion of the substrate can be easily removed by dropping a solvent to the peripheral portion while rotating the substrate.

On the contrary, the recording layer at the inner peripheral portion can not be removed by the same method as that used for removing the recording layer at the outer peripheral portion, but is removed only by, for example, wiping the recording layer away with a solvent or burning the recording layer with laser as disclosed in Japanese Patent Application Laid-Open No. Hei 2-183442.

However, according to the present inventors' investigation, those methods are complicated and of less productivity, and the recording layer can not be completely removed. And we have found that the adhesion of the protective layer is not sufficient, and therefore when the medium is allowed to stand under high temperature and high humidity conditions for a long period of time, the peeling strength at the inner peripheral portion is poor so that peeling occurs at the inner peripheral portion.

Alternatively, a recording layer at the inner peripheral portion can be removed as shown in Japanese Patent Application Laid-Open No. Hei 2-236833. That is, a reflective layer is formed on a recording layer in such a way that the recording layer protrudes from the inner and the outer edges of the reflective layer and the recording layer protruding the inner and outer edges of the reflective layer is washed away with a solvent.

We have found that, according to this method, when the reflective layer is washed with a solvent, it is damaged and thereby, the reflective layer is peeled off and noise of the resulting medium increases, because the reflective layer is a very thin metal film.

This method is also includes a complicated solvent washing step and further, the productivity is poor.

The present inventors have variously researched so as to develop a method for producing easily and at a high productivity an optical recording medium of a single plate type such that the adhesion of a protective layer to a reflective layer is excellent and no peeling occurs at the inner peripheral portion and the outer peripheral portion when subjected to a tape peeling test after the medium is stood under high temperature and high humidity conditions for a long period of time.

The present inventors have noticed an important fact that the remaining stress at the protective layer etc. is different depending on the positions of the layer, that is, the inner peripheral portion and the outer peripheral portion, and the remaining stress at the inner peripheral portion is much samller than that at the outer peripheral portion. The present inventors have found that the above-mentioned disadvantages can be solved by (1) forming a reflective layer extending over the recording layer and further forming a protective layer extending over the reflective layer at the outer peripheral portion of the substrate and (2) forming a protective layer extending over both the recording layer and the reflective layer at the inner peripheral portion, that is, it is not necessary that the reflective layer extends over the recording layer at the inner peripheral portion as shown in FIG. 3.

SUMMARY OF THE INVENTION

An object of the present invention is to provide an optical recording medium exhibiting an excellent adhesion strength of the protective layer even when stood under high humidity and high temperature conditions for a long period of time.

According to one aspect of the present invention, there is provided an optical recording medium comprising a transparent resin substrate, a recording layer overlying the substrate, a metal reflective layer overlying the recording layer, and a protective layer overlying the metal reflective layer, wherein the substrate having no recording layer at the inner peripheral portion (e.g. 6' in FIG. 4) and at the outer peripheral portion (e.g. 4 in FIG. 4), the recording layer containing a dye being provided at a region of the substrate other than the above-mentioned non-recording-layer-portions, the metal reflective layer being provided on the recording layer such that the inner peripheral portion of the metal reflective layer is substantially coterminous with that of the recording layer and the outer peripheral portion of the metal reflective layer extends over that of the recording layer to become preferably an annular form, and the inner peripheral portion and the outer peripheral portion of the protective layer extending over those of the reflective layer, respectively.

According to another aspect of the present invention, there is provided a process for producing an optical recording medium comprising a transparent resin substrate, a recording layer overlying the substrate, a metal reflective layer overlying the recording layer, and a protective layer overlying the metal reflective layer, which comprises:

forming a recording layer containing a dye by spin-coating on the substrate;

removing the recording layer in the vicinity of the outermost peripheral portion of the substrate to form a portion at the inside of the outermost periphery of the substrate where the surface of the substrate is exposed;

forming the metal reflective layer on the recording layer such that the recording layer protrudes preferably in the annular form at the inner peripheral portion of the metal reflective layer while the metal reflective layer extends over the recording layer at the outer peripheral portion and a preferable annular region having no reflective layer is provided at the outermost peripheral portion of the substrate;

coating a liquid resin capable of dissolving the recording layer at least from the protruding region of the recording layer to the outermost peripheral portion of the substrate, and thereby removing the recording layer extending over the inner peripheral portion of the reflective layer by dissolution;

curing the coated liquid resin and thereby forming on the metal reflective layer the protective layer extending over the reflective layer both at the inner and outer peripheral portions.

DESCRIPTION OF THE PREFERRED EMBODIMENTS

A process for producing an optical recording medium according to the present invention may be carried out as shown below.

Figure 1:
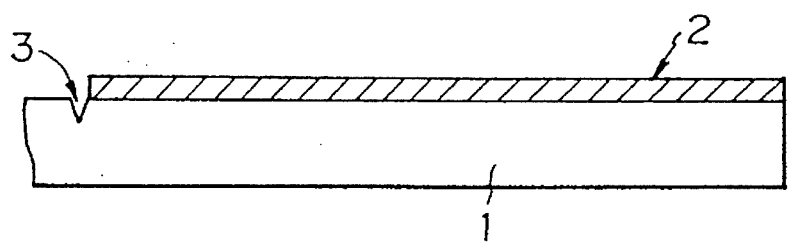
FIG. 1 shows schematically a cross section of a structure composed of a substrate and a recording layer at a step of producing an embodiment of the optical recording medium of the present invention.

Referring to FIG. 1, a recording layer 2 is formed on a substrate 1 outside of a dent 3 formed by a stamper fixing jig.

Figure 2:
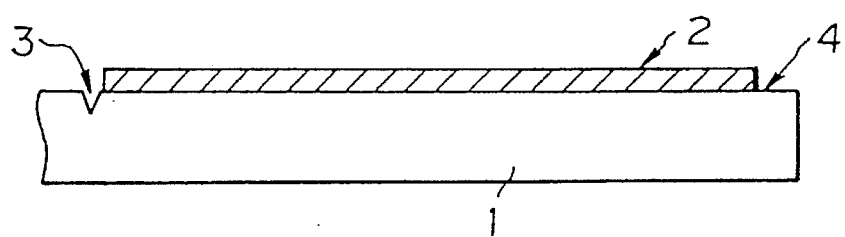
FIG. 2 shows schematically a cross section of a structure at a step following FIG. 1 where the outermost peripheral portion of the recording layer is removed.

Then, as shown in FIG. 2, the recording layer 2 in the vicinity of the outermost peripheral portion 4 of substrate 1 is removed.

Figure 3:
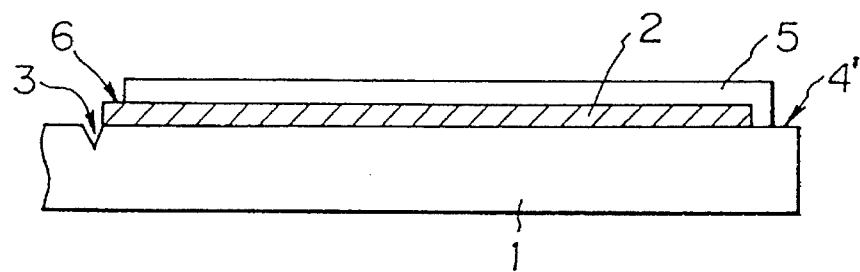
FIG. 3 shows schematically a cross section of a structure at a step following FIG. 2 where a reflective layer is formed on the recording layer.

Further, as shown in FIG. 3, a reflective layer 5 is formed such that the reflective layer 5 extends over the outer periphery of recording layer 2, but does not reach the outer periphery of substrate 1 and therefore, some outer peripheral portion 4' thereof is still exposed, and the reflective layer 5 does not reach the inner periphery of recording layer 2, that is, recording layer 2 protrudes inward exceeding the inner periphery of the reflective layer 5 as indicated by reference numeral 6.

Figure 4:
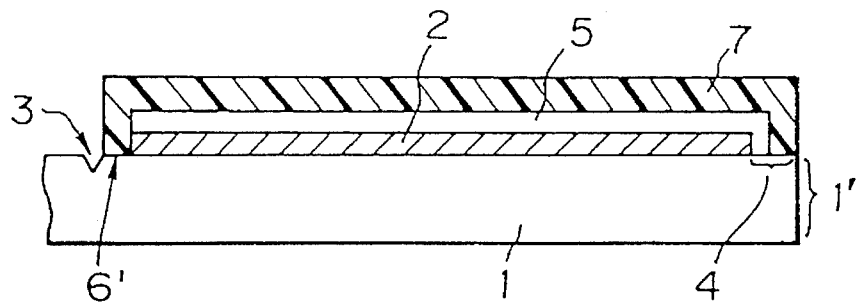
FIG. 4 shows schematically a cross section of an embodiment of the optical recording medium of the present invention.

Furthermore, a liquid resin for protective layer is coated to cover both outermost peripheral portion of substrate 1 and the whole reflective layer, from the inner peripheral portion 6 of recording layer 2 not covered with reflective layer 5 to the outer peripheral edge of substrate 1. The portion 6 of recording layer 2 is dissolved in the protective layer. As a result, as shown in FIG. 4, both recording layer 2 and reflective layer 5 are completely covered with protective layer 7. The side wall 1' of substrate 1 may be covered with an overflowing protective layer 7.

Figure 5:
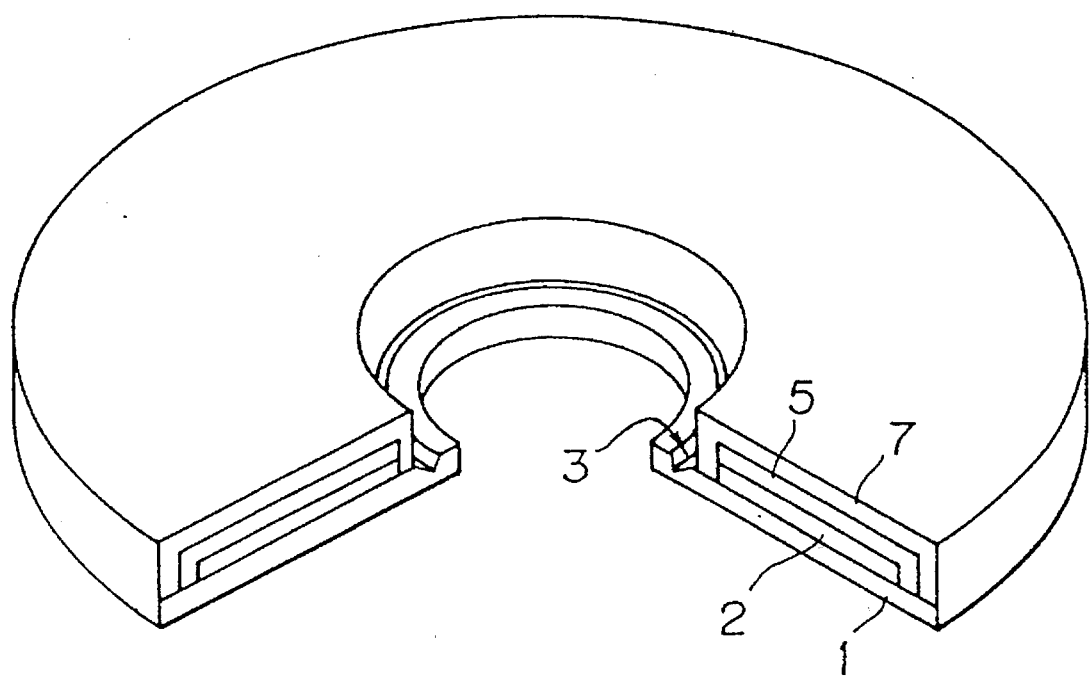
FIG. 5 is a partially cross-sectional diagrammatical perspective view illustrating an embodiment of the structure of the optical recording medium of the present invention corresponding to FIG. 4.

FIG. 5 is a perspective view of an embodiment of the optical recording medium of the present invention where 1 denotes the substrate, 2 the recording layer, 3 the dent formed by stamper fixing jig, 5 the reflective layer and 7 the protective layer.

Considering the aforedescribed structure more specifically, it is seen that the transparent resin substrate 1 has an inner peripheral portion 10 and an outer substrate periphery 11. As is seen in FIGS. 4 and 5, the recording layer 2 overlies the substrate 1 and has an inner recording periphery 12 which is displaced from the inner peripheral portion 10 of the substrate and an outer periphery 13 which is displaced from the outer substrate periphery 11. The metal reflective layer 5 overlies the recording layer 2 and has an inner reflective periphery 14 and an outer reflective peripheral portion 15. The inner reflective periphery 14 of the reflective layer coincides with the inner recording periphery of the recording layer 2 while the outer protective peripheral portion 15 overlies the outer recording periphery 13 and is in contact with the substrate 1 at the area 4.

The protective layer 7 overlies the metal reflective layer 5 and has an inner peripheral protective portion 16 and an outer peripheral protective portion 17. Inner peripheral protective portion 16 overlies the inner peripheries 12 and 14 of the recording and protective layers 2 and 5, respectively, while the outer peripheral protective portion 17 overlies the outer peripheral portion 15 of the reflective layer and is in engagement with the transparent resin substrate 1 at the outermost peripheral portion 4 of the substrate.

As a transparent resin substrate used in the present invention, such substrate capable of transmitting substantially a semiconductor laser beam is preferable. Preferable transmittance of the laser beam is 85% or higher. Further, it is preferable that optical anisotropy of the substrate is small.

Examplary suitable substrates include thermoplastic resin substrates composed of acrylic resins, polycarbonate resins, polyamide resins, polyvinyl chloride, polyolefin resins or the like.

Among these resin substrates, from the standpoints of mechanical strength of substrate, easy formation of grooves and pits, injection molded resin substrates made of acrylic resins, polycarbonate resins, or polyolefin resins are preferably, and polycarbonate resin substrates are most preferable.

The shape of the substrate may be in the form of plate or film, or circle (disc) or card. For example, in case of a circle, it may have a center hole. The surface of the substrate is provided with grooves for controlling the recording position. The surface may have partly some pits.

Such grooves and/or pits are preferably formed when the substrate is fabricated by injection molding or cast molding. For forming grooves and pits when the substrate is molded, a stamper having grooves and pits is mounted in the mold for a molding machine and the grooves and/or pits are transferred to the substrate.

According to the present invention, the optical recording medium comprises a transparent resin substrate, and a recording layer containing a dye, a reflective layer and a protective layer subsequently superimposed on the substrate.

The dyes used in the recording layer containing a dye may be dyes having absorption in the wavelength region of oscillation of a semiconductor laser, such as polymethine dye, phthalocyanine dye, naphthalocyanine dye, naphthoquinone dye, azulene dye, dithiol metal complex dye and the like.

These dyes may have various substituents so as to control the solubility of the dye in a solvent to a desirable range or impart desirable recording characteristics. The dyes may be used alone or in combination.

Among the dyes, phthalocyanine dye and naphthalocyanine dye are preferable from the standpoint of durability.

Among them, alkoxy substituted phthalocyanine, alkylthio substituted phthalocyanine and halogenated phthalocyanine derived from these substituted phthalocyanines are exemplified.

More particular substituted phthalocyanine dyes as described in the above-mentioned EP-0337209 and EP-0373643 are preferable.

According to the present invention, the recording layer containing a dye can be usually formed by a coating method. Among the coating methods, a spin-coating method is preferable.

When the above-mentioned dye is formed into a layer by a coating method, the dye may be dissolved in a solvent not adversely affecting the substrate. Such solvents substantially incapable of dissolving the resin substrate are, for example, aliphatic or alicyclic hydrocarbons such as hexane, heptane, octane, decane, cyclohexane, and the like; ether type nonpolar solvents such as diethyl ether, dibutyl ether, diisopropyl ether and the like; and alcoholic solvents such as methyl alcohol, ethyl alcohol, isopropyl alcohol, allyl alcohol, methyl cellosolve, and the like.

The resulting dye solution may be applied, by a spin-coating, to the whole surface of the substrate outside of the dent at the inner peripheral portion formed by a stamper fixing jig, for example, in the case of an injection molded resin substrate.

Then, according to the present invention, the recording layer at the outermost peripheral portion of the substrate is removed with a solvent so as to form an exposed substrate portion at the outermost peripheral portion.

The removing method may be a method of dropping a solvent onto a portion of the recording layer to be removed in the vicinity of the outermost peripheral portion while rotating the substrate. The solvent used there is preferably a solvent capable of dissolving 3% by weight or more of the dye.

Exemplary suitable solvents for removing the recording layer include:

the above-mentioned solvents used for coating the dye;

halogen containing solvents such as carbon tetrachloride, chloroform, methylchloroform, 1,1,2-trichloroethane, trichlene, dichloromethane, and the like;

hydrocarbon solvents such as benzene, toluene, xylene, and the like;

ketone type solvents such as cyclohexanone, methyl ethyl ketone, methyl isobutyl ketone, and the like;

alcoholic solvents such as butyl cellosolve, ethyl cellosolve, and the like; and ester type solvents such as butyl acetate, amyl acetate, cellosolve acetate and the like.

The solvents may be used alone or in combination.

When a recording layer containing a dye is prepared, in addition to the above-mentioned dye, there may be used resins such as nitrocellulose, ethylcellulose, acrylic resins, polystyrene resins, urethane resins and the like, leveling agents, deforming agents and the like in an amount which does not adversely affect the effect of the present invention, for example, about 20% or less, preferably about 10% or less.

Then, according to the present invention, a reflective layer is provided on the recording layer.

As the reflective layer on the recording layer, in usual, a metal thin film is preferably used.

Taking the playability of the medium of the present invention by commercially available CD players into consideration, the reflectivity of the medium is preferably 60% or more. As preferable metals, there may be mentioned aluminum, gold, silver, copper, platinum, nickel and the like and alloys containing the metals as mentioned above as a component or components. The reflective layer made of the metal may be formed by vapor deposition, sputtering and the like. Usually, the thickness of reflective layer is preferably 500–2000 Å.

When the substrate is a circle, the reflective layer is formed such that at the inner peripheral portion the recording layer protrudes in an annular form under the reflective layer, and at the outer peripheral portion the reflective layer extends over the recording layer, but the exposed portion of the substrate remains at the outermost peripheral portion of the substrate.

In order to protect the metal reflective layer, a protective layer is formed on the reflective layer. As the protective layer, liquid resins are used. In particular, from the standpoint of productivity, liquid resins curable by ultraviolet ray irradiation are preferable. The thickness of the protective layer is preferably about 1–15 μm.

The protective layer may be prepared by coating with a liquid resin the area ranging from the region where the recording layer is provided or from the region which is inside of the inner peripheral portion of the recording layer where the recording layer is not provided, to the outermost peripheral portion of the substrate (a portion where the substrate is exposed) over the outer periphery of the reflective layer, and then the coated resin is cured. The side wall 1' (in FIG. 4) of the substrate may be covered with an overflowing protective layer 7 (in FIG. 4).

For example, when a liquid resin capable of dissolving the recording layer is coated on the substrate having a dent formed by a stamper fixing jig by a spin-coating method, the liquid resin is dropped onto the outside of said dent and then the substrate is rotated to coat the whole surface, and the coated liquid resin is cured.

As a result of the above-mentioned coating procedure, at the innermost peripheral portion the most portion of the recording layer protruding from the reflective layer is dissolved away by the liquid resin and the protective layer is formed extending over both the recording layer and the reflective layer.

On the other hand, with respect to the outer periphery, there is provided an exposed substrate portion at the outermost peripheral portion and thereby a protective layer can be formed extending over the recording layer and the reflective layer.

Therefore, it is preferable that the liquid resin used for forming the protective layer is of the kind capable of dissolving 0.5% by weight or more of the recording layer, and more preferably, of the kind capable of dissolving 1% by weight or more of the recording layer.

Further, from the standpoint of the adhesion between the protective layer and the substrate, it is preferable that the liquid resin used is of the kind capable of dissolving at least 0.5% by weight, more preferably at least 1% by weight of the substrate resin.

According to the present invention, the most part of the recording layer protruding from the inner periphery of the reflective layer can be dissolved away with the liquid resin. It is not always necessary to completely dissolve away the protruding recording layer. In this invention, the liquid resin being capable of dissolving both the substrate resin and the recording layer, the liquid resin penetrates through the remaining recording layer to the surface of the substrate, and the substrate is also dissolved with the liquid resin and thereby, the resin and the substrate are mixed with each other so that the adhesion between the protective layer and the substrate is improved.

The optical recording medium of the present invention is irradiated with a laser beam through the substrate to record or read out signals. The wavelength of the laser beam used is, in usual, preferably 640–850 nm, and a semiconductor laser having an oscillatory wavelength of such range as above is preferable. For recording, the laser output is made about 5–12 mW on the recording layer while rotating the medium, and for readout, the laser output is made about 1/10 times that for recording.

Printing may be made on the protective layer of the optical recording medium of the present invention.

The following examples illustrate the present invention, but it is to be understood that they are given for the purpose of illustration and not limitation.

The dyes used in the following examples were prepared according to EP-0337209 or EP-0373643.

EXAMPLE 1

A 3.5 weight % solution of a brominated (average 3.0 bromine atoms per molecule) Pd-tetra-(t-butyl-cyclohexyloxy) phthalocyanine dye in octane was dropped onto an outside portion of a dent formed by stamper fixing jig on the surface of an injection molded polycarbonate resin substrate (1.2 mm thick, 120 mm in outer diameter and 15 mm in inner diameter) having a spiral groove (140 nm in depth, 0.5 µm in width, 1.6 µm in pitch) and then the resin substrate was rotated at 1500 rpm for 10 sec. to form a recording layer.

Further, the substrate was rotated and then while rotating the substrate, octane was dropped onto the recording layer of the outermost peripheral portion of the substrate to remove the recording layer at the outermost peripheral portion. Then the substrate having the recording layer was dried at 40° C. for 10 min. In such a way, there was formed a recording layer substantially composed of the phthalocyanine dye which ranged from an outside portion of said dent (as to the inner peripheral portion) to a portion which was by about 1.5 mm inside from the outermost periphery of the substrate (as to the outer peripheral portion).

On the recording layer thus formed was formed a gold thin layer of 80 nm thick as a reflective layer by sputtering. The outer peripheral portion of the reflective layer extended over the outer periphery of the recording layer, but no reflective layer was formed at the annular region at the outer peripheral portion of about 1 mm wide.

The reflective layer was formed at an innermost peripheral portion such that the recording layer protruded about 1 mm in width.

An ultraviolet ray-curable resin (SD-17, trade name, supplied by Dainihon Ink Co., about 35 cps) was coated at the whole region outside of the dent by spin-coating.

Then, the whole surface of the coated resin was irradiated with ultraviolet ray (400 mJ) and cured to form a protective layer. The thickness of the resulting protective layer was about 7 µm.

When the ultraviolet ray-curable resin was coated, the portion of the recording layer protruding from the innermost reflective layer was brought into contact with add dissolved in the ultraviolet ray-curable resin, and thereby an ultraviolet ray-curable resin in which a minute amount of the dye constituting the recording layer was dissolved was coated on the reflective layer, and the protective layer was formed extending over the recording layer and the reflective layer.

Further, at the outermost peripheral portion the protective layer was formed extending over both the recording layer and the reflective layer.

When the inner peripheral portion and the outer peripheral portion of the medium thus produced were observed from the substrate side and the protective layer side by means of a microscope, at the outer peripheral portion the reflective layer extended over the recording layer by about 0.5 mm and the protective layer extended over the reflective layer by about 1 mm, and thereby the protective layer was formed up to the outermost periphery of the substrate as shown in FIG. 4.

On the other hand, it was observed that at the inner peripheral portion the reflective layer and the recording layer were formed such that their inner ends were at about the same position and the protective layer were formed extending over both the recording layer and the reflective layer by about 1 mm. as shown in FIG. 4.

In order to evaluate the adhesion of the protective layer of the medium thus prepared, tape peeling tests with an adhesive tape were conducted. No peeling of the protective layer was observed.

For durability tests, the medium was allowed to stand for 2000 hours at 80° C. and 90% RH, and then peeling tests were conducted. No peeling of the protective layer was observed.

Further, solubility of the dye and that of the substrate resin in the uncured ultraviolet ray-curable resin were measured. Each of them was dissolved in the ultraviolet ray-curable resin in an amount of 1% by weight or more.

Comparative Example 1

The procedure of Example 1 was repeated except that a 3.5 weight % solution of a brominated (average 3.0 bromine atoms per molecule) Pd-tetra-(4-methyl-pentan-2-oxy) phthalocyanine dye in octane was used in place of the dye in Example 1, and a medium was produced.

The dye used in this medium was hardly soluble in the ultraviolet ray-curable resin and the recording layer at the innermost peripheral portion could not be removed, but remained such that the portion protruded from the inner periphery of the reflective layer. Therefore, at the innermost peripheral portion the protective layer could not be formed extending over the recording layer.

Tape peeling tests were conducted according to Example 1. The protective layer was not peeled off at all, but after the humidity and heat resistance test, the outermost peripheral portion did not peel, but the innermost peripheral portion peeled.

Comparative Example 2

The procedure of Example 1 was repeated up to the formation of a reflective layer. After the reflective layer was formed, octane was dropped onto the inner peripheral portion while rotating the substrate so as to remove the recording layer at the inner peripheral portion.

The recording layer protruding at the inner peripheral portion was removed, but wrinkles formed at the reflective layer. The wrinkles appeared to be attributable to peeling of the reflective layer.

This indicates that it is difficult to remove the recording layer protruding from the reflective layer with a solvent.

EXAMPLE 2

The procedure of Example 1 was repeated except that a 3.2 wt. % solution of a brominated (average 3.5 bromine atoms per molecule) Pd-tetra-(2,4-dimethylpentan-3-oxy) phthalocyanine dye was used in place of the dye in Example 1, and a medium was produced.

The adhesion of the protective layer was evaluated. No peeling was observed both before and after the durability test.

This dye was dissolved in the ultraviolet ray-curable resin in an amount of 1% by weight or more.

What is claimed is:

1. An optical recording medium comprising:
    a transparent resin substrate having an inner peripheral portion and an outer substrate periphery;
    a dye-containing recording layer spin-coated onto and overlying the substrate and having an inner recording periphery and an outer recording periphery, the inner recording periphery being displaced outwardly from the inner peripheral portion of the substrate and the outer recording periphery being displaced inwardly from the outer substrate periphery;
    a metal reflective layer overlying the recording layer, the metal reflective layer having an inner reflective periphery, which is coterminous with the inner periphery of the recording layer, and an outer reflective periphery which extends beyond the outer recording periphery and onto but not coterminous with the outer peripheral edge of the substrate; and
    a protective layer overlying the metal reflective layer and having an inner peripheral protective portion and an outer peripheral protective portion, the inner peripheral protective portion overlying the inner peripheral portion of both the recording layer and the metal reflective layer and contacting the inner peripheral portion of the substrate and containing dissolved therein a portion of the recording layer, the outer peripheral protective portion overlying the outer peripheral reflective portion and contacting the substrate proximate the outer substrate periphery, and the protective layer being produced from a liquid resin capable of dissolving the recording layer upon contact therewith and the recording layer being produced by being spin coated onto the substrate of the inner periphery of the reflective layer thereafter applied over the recording layer and the inner peripheral portion of the recording layer which extends inwardly from and lacks a coating of the metal reflecting layer thereon thereafter being selectively removed by being dissolved in the liquid resin used to form the protective layer by contact therewith.

2. An optical recording medium according to claim 1, wherein the transparent substrate is a polycarbonate.

3. An optical recording medium according to claim 1, wherein the dye in the recording layer is a phthalocyanine dye or naphthalocyanine dye.

4. An optical recording medium according to claim 1, wherein the metal reflective layer overlying the recording layer is aluminum, gold, silver, copper, platinum, nickel or alloy thereof.

5. An optical recording medium according to claim 1, wherein the protective layer overlying the metal reflective layer is an ultraviolet ray cured resin.

6. An optical recording medium according to claim 1, wherein the transparent substrate is a polycarbonate; wherein the dye in the recording layer is a phthalocyanine dye or naphthalocyanine dye; wherein the metal reflective layer overlying the recording layer is aluminum, gold, silver, copper, platinum, nickel or alloy thereof; and wherein the protective layer overlying the metal reflective layer is an ultraviolet ray cured resin.

7. The optical recording medium of claim 1, wherein the recording medium is a disc.

8. The medium according to claim 1 in which the substrate is composed of polycarbonate resin and injection-molded.

* * * * *